United States Patent [19]
Kalen

[11] 3,863,351
[45] Feb. 4, 1975

[54] GAUGE FOR CHECKING RADIUS AND SPHERICAL SURFACE

[75] Inventor: Stuart E. Kalen, Sterling Heights, Mich.

[73] Assignee: Cogsdill Tool Products, Inc., Farmington, Mich.

[22] Filed: Jan. 11, 1974

[21] Appl. No.: 432,497

[52] U.S. Cl. ............ 33/169 R, 33/174 Q, 33/174 P
[51] Int. Cl. ........................... G01b 3/22, G01b 5/20
[58] Field of Search .......... 33/169 C, 169 R, 172 D, 33/174 Q, 178 R, 147 M, 174 P

[56] References Cited
UNITED STATES PATENTS
1,303,387   5/1919   Pogue .................................. 33/172

Primary Examiner—Samuel B. Rothberg
Assistant Examiner—Willis Little
Attorney, Agent, or Firm—Harness, Dickey & Pierce

[57] ABSTRACT

A gauge has a support for a workpiece which has a spherical section of a selected radius which is to be gauged. The gauge has a cradle which is swingable to advance a spherical surface with a known radius into engagement with an indicator which provides an indicator reading. The workpiece is clamped on the cradle for axial movement into engagement with the indicator to a position where the indicator reading is repeated. The spherical surface is moved to have all points thereof engaged by the indicator so that any changes in the reading can be noted. When the reading remains constant, the spherical surface is gauged to be the one desired of the predetermined radius.

5 Claims, 2 Drawing Figures

PATENTED FEB 4 1975　　　　　　　　　　　　　　3,863,351

GAUGE FOR CHECKING RADIUS AND SPHERICAL SURFACE

BACKGROUND OF THE INVENTION

While various gauges have been provided to check the radius and spherical surface of a workpiece, the present gauge is believed to be unique in that the gauging takes place from the finished spherical surface as there is no other datum point on the workpiece by which the workpiece position could be ascertained.

SUMMARY OF THE INVENTION

The invention pertains to a gauge which is capable of checking a spherical section and the radius thereof on a workpiece which is to be gauged. In the case illustrated, the workpiece is a planetary gear of the type used in a differential of an automotive vehicle. The workpiece has no datum point other than the finished surface from which measurements can be made. As a result, the spherical surface and radius must be measured directly from the finished spherical section. The workpiece is a rough blank provided with the shape of the pinion gear with the spherical section machined thereon. A burnishing operation is performed on the machined spherical surface to provide a high polish thereon which requires gauging for sphericity and for the radius of the surface.

The gauge has a base and a pair of uprights connected by a bridge at the top which supports an indicator centrally between the uprights. A cradle has trunnions on the ends which are mounted in bearings on the uprights for swinging movement by the operation of a knob on one trunnion and by a friction lock on the other trunnion which holds the cradle in the position to which it is moved. The center of the cradle has a work supporting mechanism embodying a cylindrical spindle which is movable axially in the cradle and which has a screw threaded therein provided with a truncated conical head which expands a collet after the workpiece is placed thereover to secure the workpiece in fixed position.

The cradle is provided with an arcuate surface of a radius which is similar to the surface and radius which is to be produced on the workpiece. The arcuate surface is swung into engagement with the indicator and a reading is obtained which is reproduced by the advancement of the finished surface of the workpiece with the indicator so that the entire surface can be checked for sphericity and for the radius thereof. This is accompanied by the swinging of the cradle and the rotation of the cylindrical spindle on which the workpiece is supported.

DESCRIPTION OF THE PREFERRED EMBODIMENT

Figures 1, 2:
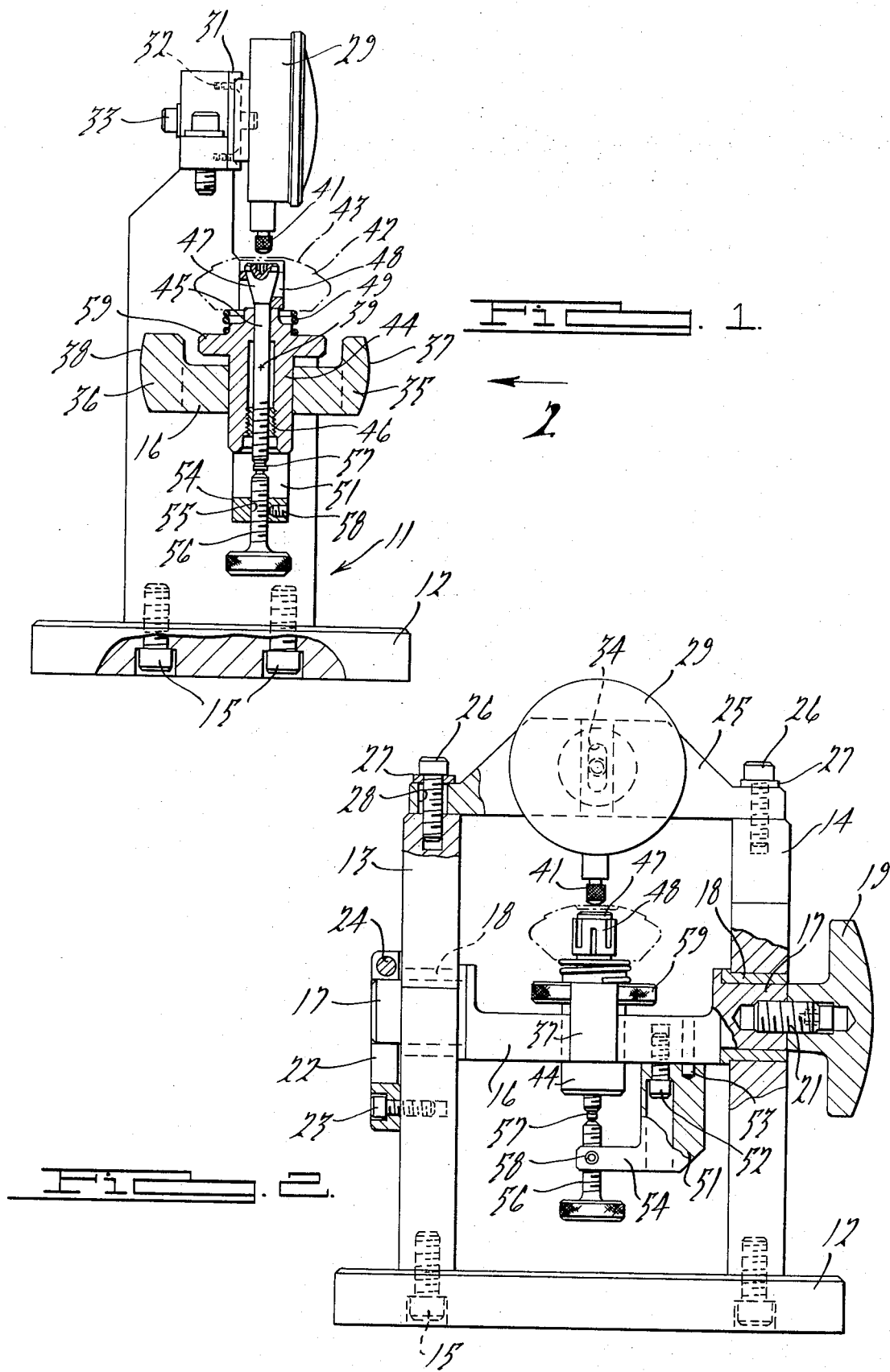
FIG. 1 is a broken sectional view in elevation of the gauge of the present invention.
FIG. 2 is a view of the structure illustrated in FIG. 1, taken at the point 2 thereof with parts broken away and in section.

The gauge 11 has a base 12 and two uprights 13 and 14. The uprights are secured to the base by socket head cap screws 15. A cradle 16 has trunnions 17 at the ends which are supported in bearings 18 in the uprights 13 and 14. A knob 19 is secured by a threaded stud 21 to one of the trunnions 17 while the opposite trunnions 17 is prevented from swinging by a friction lock 22 which is secured to the upright 13 by a cap screw 23. The friction engagement of the friction lock 22 with the trunion 17 is adjusted by a screw 24. Enough friction is provided to prevent the cradle from swinging and to remain in a position to which it is rocked.

The top of the uprights supports a bridge member 25 by cap screws 26 and washers 27, space being provided between the wall of the apertures 28 and the screws 26 to permit adjustment to have the centerline of an indicator 29 mounted thereon located on the center of the cradle 16. The indicator 29 straddles a mounting bracket 31 which is secured to the bridge member by a pair of screws 32 with a cap screw 33 extending through the bridge member and bracket 31 into a threaded aperture of the indicator. As illustrated in FIG. 2, the screw extends through a slot 34 which permits the raising and lowering of the indicator 29 on the bridging member 25.

The cradle has extending arms 35 and 36 which have a section of a spherical surface 37 and 38 respectively disposed thereon from a center 39, the radius from the center to the surface 38 being longer than the radius from the center to the surface 37. The spherical surfaces are in a plane in which the cradle is swung by the operation of the knob 19 to bring one of the surfaces into engagement with the indicator finger 41 so that a reading may be obtained on the indicator for the particular spherical surface and radius. A workpiece 42 having a spherical surface 43 is mounted on a cylindrical rotatable support 44 disposed on the center of the cradle 16. A screw 45 has its lower end threaded into a threaded insert 46 with a truncated conical head 47 on the opposite end disposed within an expandable collet 48. A spring 49 may be provided on the upper end of the support 44 on which the workpiece 42 may rest at the time the head 47 is rotated to expand the collet to fixedly support the workpiece 42 thereon.

An L-shaped bracket 51 is secured to the underside of the cradle 16 by a screw 52 after being located in position by a dowel 53. The extending end 54 of the bracket has a threaded aperture 55 which is aligned with the center of the screw 45 and finger 41 of the indicator 29. A screw 56 is threaded into the aperture 55 having a swivel ball 57 on the end which engages a socket in the end of the screw 45, the screw and the support 44 being movable toward the indicator by the screw 56. A soft-nosed set screw 58 in the bracket 51 may engage the thread of the screw 56 to maintain it against accidental turning after it is adjusted. After a reading is obtained on the indicator, the cradle is swung to have the surface 43 of the workpiece located below the indicating finger 41 and the workpiece is advanced to have the surface engage the finger and move the indicator to the setting obtained from the spherical surface 37. The surface may be explored by the finger 41 by the swinging of the cradle and the rotation of the support 44 by the knurled knob 59 which is a part thereof. If the advancing of the surface 43 over the finger 41 does not produce any change in the reading of the indicator, it is then known that the surface is of correct spherical form of the selected radius. If a workpiece having a spherical surface of the larger radius, that which equals the radius of the surface 38, then the surface 38 will be employed to obtain a reading on the indicator which may be raised to a higher position by the unclamping and clamping of the screw 33.

The gauge is believed unique in that it is able to check the sphericity of a surface and its radius from the surface itself since the workpiece has no other datum point from which a reading could be taken. By providing a spherical surface and a radius on the cradle of the gauge, the indicator is set to a predetermined reading which if checked with the reading obtained from the workpiece surface provides assurance that the workpiece has a proper spherical section of the selected radius.

I claim:

1. In a gauge, a base having a pair of uprights, a cradle, trunnions on said cradle pivotally secured on said uprights for rotatably supporting said cradle therebetween, an indicator supported on said uprights above said cradle, a support for a workpiece on said cradle which is adjustable axially toward and away from said indicator, means on said cradle for obtaining a reading on said indicator for a radius to be produced for the surface of the workpiece, and means for moving a workpiece mounted on the support into engagement with the indicator until said reading is reproduced thereon and thereafter checking the sphericity of the workpiece surface relative to said reading.

2. In a gauge as recited in claim 1, wherein means are provided for moving said cradle and support to have all points of the spherical area engaged by said indicator.

3. In a gauge as recited in claim 2, wherein said support is rotatable and movable axially, a collet at the upper end of said support, and a screw on the centerline of the support having a truncated conical head for expanding said collet when rotated for securing the workpiece in fixed position on the support.

4. In a gauge as recited in claim 3, wherein a bracket is provided on the bottom of the cradle having a threaded aperture on the axis of said screw, and a screw in said threaded aperture for moving said support toward and from said indicator.

5. In a gauge as recited in claim 4, wherein said cradle is provided with a spherical section having a known radius from which an indicator reading is obtained, the movement of the spherical surface of the workpiece toward the indicator to have the reading repeated thereon and thereafter moved relative thereto without materially changing the reading thereof provides assurance that the radius is the same as that set for the spherical section on the cradle.

* * * * *